United States Patent
Hou et al.

(10) Patent No.: US 10,846,556 B2
(45) Date of Patent: Nov. 24, 2020

(54) VEHICLE INSURANCE IMAGE PROCESSING METHOD, APPARATUS, SERVER, AND SYSTEM

(71) Applicant: Advanced New Technologies Co. Ltd., Grand Cayman (KY)

(72) Inventors: Jinlong Hou, Zhejiang (CN); Haitao Zhang, Zhejiang (CN); Xin Guo, Zhejiang (CN); Juan Xu, Zhejiang (CN); Jian Wang, Zhejiang (CN); Yuan Cheng, Zhejiang (CN); Danni Cheng, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/719,329

(22) Filed: Dec. 18, 2019

(65) Prior Publication Data

US 2020/0125885 A1 Apr. 23, 2020

Related U.S. Application Data

(63) Continuation of application No. PCT/CN2018/097336, filed on Jul. 27, 2018.

(30) Foreign Application Priority Data

Jul. 31, 2017 (CN) .......................... 2017 1 0640784

(51) Int. Cl.
*G06K 9/46* (2006.01)
*G06K 9/62* (2006.01)
(Continued)

(52) U.S. Cl.
CPC ......... *G06K 9/4628* (2013.01); *G06K 9/6267* (2013.01); *G06N 3/0454* (2013.01);
(Continued)

(58) Field of Classification Search
CPC .. G06K 9/4628; G06K 9/6267; G06N 3/0454; G06N 3/08; G06Q 10/10; G06Q 40/08
See application file for complete search history.

(56) References Cited

U.S. PATENT DOCUMENTS 7,668,850 B1 * 2/2010 Bierner .................. G06F 16/38
707/694
7,672,951 B1 * 3/2010 Bierner .................. G06F 16/38
707/999.01
(Continued)

FOREIGN PATENT DOCUMENTS

| CN | 105678622 A | 6/2016 |
|---|---|---|
| CN | 106203330 A | 12/2016 |

OTHER PUBLICATIONS

International Search Report of PCT Application No. PCT/CN2018/097336, dated Oct. 12, 2018.

*Primary Examiner* — Manav Seth
(74) *Attorney, Agent, or Firm* — Finnegan, Henderson, Farabow, Garrett & Dunner, L.L.P.

(57) ABSTRACT

A vehicle insurance image processing method includes: acquiring a vehicle insurance image; processing the vehicle insurance image by using a preset image classification algorithm, to determine at least one category label of the vehicle insurance image; and storing, based on classification, the vehicle insurance image in a corresponding usage scenario according to the at least one category label.

10 Claims, 10 Drawing Sheets

(51) Int. Cl.
*G06N 3/04* (2006.01)
*G06N 3/08* (2006.01)
*G06Q 10/10* (2012.01)
*G06Q 40/08* (2012.01)

(52) U.S. Cl.
CPC .............. *G06N 3/08* (2013.01); *G06Q 10/10* (2013.01); *G06Q 40/08* (2013.01)

(56) References Cited

U.S. PATENT DOCUMENTS

| | | | | |
|---|---|---|---|---|
| 7,809,587 B2* | 10/2010 | Dorai | ............... | G06Q 40/08 703/6 |
| 7,912,246 B1* | 3/2011 | Moon | ............... | G06K 9/00221 382/103 |
| 7,924,323 B2* | 4/2011 | Walker | ............... | G11B 27/034 348/231.2 |
| 8,111,948 B2* | 2/2012 | Isomura | ............... | G06T 11/60 382/294 |
| 8,296,284 B2* | 10/2012 | Bierner | ............... | G06F 16/38 707/708 |
| 8,305,442 B2* | 11/2012 | Millar | ............... | G06K 9/6202 348/148 |
| 8,538,172 B2* | 9/2013 | Bandou | ............... | G06K 9/6257 382/100 |
| 8,712,893 B1* | 4/2014 | Brandmaier | ............... | G06F 16/51 705/35 |
| 8,856,639 B1* | 10/2014 | Strudell | ............... | G06Q 10/00 715/221 |
| 9,158,744 B2* | 10/2015 | Rao | ............... | G06F 40/117 |
| 9,400,918 B2* | 7/2016 | Yin | ............... | G06K 9/00221 |
| 9,524,450 B2* | 12/2016 | Ravindran | ............... | G06K 9/00 |
| 9,659,384 B2* | 5/2017 | Shaji | ............... | G06K 9/00677 |
| 10,102,583 B2* | 10/2018 | Strange | ............... | G06Q 40/08 |
| 10,275,833 B1* | 4/2019 | Christopulos | ............... | G06K 9/00637 |
| 10,394,835 B1* | 8/2019 | Rickrode | ............... | G06F 21/6245 |
| 10,410,292 B2* | 9/2019 | Wang | ............... | G06K 9/4671 |
| 10,504,009 B2* | 12/2019 | Mu | ............... | G06N 3/04 |
| 10,528,841 B2* | 1/2020 | Wang | ............... | G08G 1/0175 |
| 2005/0251427 A1* | 11/2005 | Dorai | ............... | G06Q 10/10 705/4 |
| 2009/0234678 A1* | 9/2009 | Arenas | ............... | G06Q 10/10 705/4 |
| 2013/0287265 A1* | 10/2013 | Nepomniachtchi | ............... | G06K 9/00442 382/115 |
| 2013/0290036 A1* | 10/2013 | Strange | ............... | G06Q 40/08 705/4 |
| 2014/0019166 A1* | 1/2014 | Swanson | ............... | G06Q 40/08 705/4 |
| 2014/0195891 A1* | 7/2014 | Venkata Radha Krishna Rao | ............... | G06F 40/117 715/234 |
| 2014/0229207 A1* | 8/2014 | Swamy | ............... | G06K 9/4604 705/4 |
| 2016/0140424 A1* | 5/2016 | Wang | ............... | G06K 9/66 382/156 |
| 2018/0082378 A1* | 3/2018 | Kelsh | ............... | H04L 67/12 |
| 2018/0082379 A1* | 3/2018 | Kelsh | ............... | G06Q 50/22 |
| 2018/0182039 A1* | 6/2018 | Wang | ............... | G06K 9/4609 |
| 2018/0253618 A1* | 9/2018 | Wang | ............... | G06K 9/3258 |
| 2020/0034958 A1* | 1/2020 | Campbell | ............... | G06Q 10/10 |
| 2020/0050867 A1* | 2/2020 | Zhang | ............... | G06K 9/00711 |

* cited by examiner

VEHICLE INSURANCE IMAGE PROCESSING METHOD, APPARATUS, SERVER, AND SYSTEM

CROSS-REFERENCE TO RELATED APPLICATIONS

This application is a continuation application of International Application No. PCT/CN2018/097336, filed on Jul. 27, 2018, which is based upon and claims priority to Chinese Patent Application No. 201710640784.8, filed on Jul. 31, 2017, the entire contents of all of which are incorporated herein by reference.

TECHNICAL FIELD

The present specification relates to the field of image data processing technologies and, more particularly, to a vehicle insurance image processing method, apparatus, server, and system.

TECHNICAL BACKGROUND

Conventionally, in a vehicle insurance claim service, when an insured vehicle is involved in an accident, the insurance provider usually sends an operator or a worker of an entrusted partner to the site of the accident, to capture vehicle images and accident site images, for subsequent vehicle loss assessment and information verification. Currently, to efficiently manage vehicle insurance images captured in a vehicle accident, the insurance provider usually verifies the vehicle insurance images manually, to determine the usage categories of these images, such as vehicle damage photos, object damage photos, certificate photos, and the like. As the vehicle insurance services rapidly increase, the service provider needs to deal with more and more vehicle insurance cases, and the data volume of vehicle insurance images obtained at sites is increasingly large. For example, for some service providers, about 40 photos are taken in each vehicle insurance case on average, and even more than 200 photos are taken in a rather complicated vehicle insurance case, which increases the manpower and time costs in manual recognition and classification of the vehicle insurance images. Therefore, a manner of processing the vehicle insurance images more rapidly and accurately is needed in the industry.

SUMMARY

Objectives of embodiments of the present specification are to provide a vehicle insurance image processing method, apparatus, server, and system, which can automatically recognize a usage scenario of a vehicle insurance image, and rapidly and accurately determine scenario classification of the vehicle insurance image.

In an embodiment, a vehicle insurance image processing method includes: acquiring a vehicle insurance image; processing the vehicle insurance image by using a preset image classification algorithm, to determine at least one category label of the vehicle insurance image; and based on classification, storing the vehicle insurance image in a corresponding usage scenario according to the at least one category label.

In an embodiment, a vehicle insurance image processing apparatus includes a processor and a memory for storing instructions executable by the processor. When executing the instructions, the processor performs: acquiring a vehicle insurance image; processing the vehicle insurance image by using a preset image classification algorithm, to determine at least one category label of the vehicle insurance image; and based on classification, storing the vehicle insurance image in a corresponding usage scenario according to the at least one category label.

In an embodiment, a server includes at least one processor and a memory for storing instructions executable by the processor. When executing the instructions, the at least one processor performs: acquiring a vehicle insurance image; processing the vehicle insurance image by using a preset image classification algorithm, to determine at least one category label of the vehicle insurance image; and based on classification, storing the vehicle insurance image in a corresponding usage scenario according to the at least one category label.

In an embodiment, a vehicle insurance image system includes a collected-image storage unit, an algorithm server, and a vehicle insurance image database. The algorithm server includes at least one processor and a memory for storing instructions executable by the processor. When executing the instructions, the at least one processor performs: acquiring a vehicle insurance image from the collected-image storage unit; processing the vehicle insurance image by using a preset image classification algorithm, to determine at least one category label of the vehicle insurance image; and storing the vehicle insurance image, according to the at least one category label, in a storage zone of a corresponding usage scenario in the vehicle insurance image database.

The vehicle insurance image processing method, apparatus, server, and system provided by embodiments of the specification can automatically process vehicle insurance images by using a selected image classification algorithm, to recognize the category of each vehicle insurance image. By the solutions of the embodiments of the present specification, accuracy in classification of vehicle insurance images and efficiency of labeling vehicle insurance images can be greatly enhanced, the time spent in manual recognition and processing can be shortened, and the processing accuracy and reliability of vehicle insurance images can be improved.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification will be described below with reference to the accompanying drawings. The described embodiments are examples rather than all the embodiments consistent with the specification. Other embodiments acquired based on the described embodiments by those of ordinary skill in the art without creative effort all belong to the protection scope of the specification.

The specification provides method operation steps or apparatus structures as shown in the following embodiments or accompanying drawings. However, the method or apparatus may include more or fewer operation steps or modular units after some of them are combined. The execution order of these steps or the module structure of an apparatus is not limited to the execution order or module structure shown in the embodiments or the accompanying drawings of the specification. When applied in an actual apparatus, such as a server or terminal product, the method or module structure may be executed sequentially or in parallel (for example, by a parallel processor, or in a multithread environment or even an implementation environment based on distributed processing or a server cluster) according to the method or module structure shown in the embodiments or the accompanying drawings.

Figure 1:
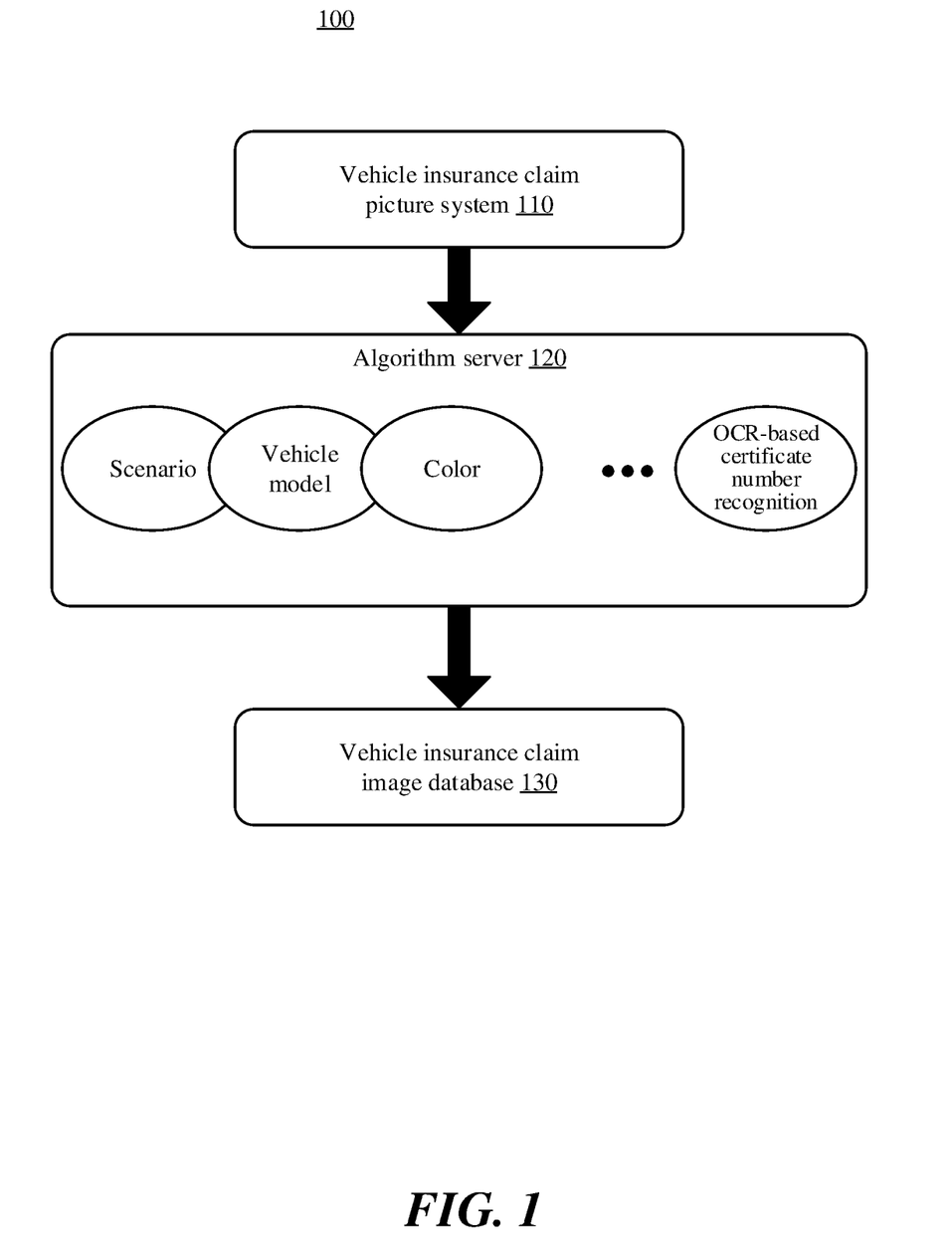
FIG. 1 is a schematic diagram of a system using a vehicle insurance image processing method according to an embodiment.

In a vehicle insurance claim service, photos collected at the site of an accident may all be stored in a database of an insurance provider, such as a vehicle insurance claim picture system. FIG. 1 is a schematic diagram of a system 100 using a vehicle insurance image processing method according to an embodiment. The system 100 may include: a vehicle insurance claim picture system 110 storing vehicle insurance images which are collected by an operator at the site, or acquired from other system databases, or provided by a third party, an algorithm server 120 recognizing and classifying the vehicle insurance images, and a vehicle insurance claim image database 130 which stores classified vehicle insurance images. The vehicle insurance claim picture system 110 may store vehicle insurance image data related to multiple vehicle insurance services, and each vehicle insurance service may include multiple vehicle insurance images. The vehicle insurance images belonging to the same vehicle insurance case may be identically labeled for distinction. As the vehicle insurance services increase, the vehicle insurance claim picture system 110 may store numerous vehicle insurance images. By the solutions of the embodiments of the specification, these vehicle insurance images collected at sites can be grouped into different handling scenarios (or referred to as usage scenarios) according to different handling needs of vehicle insurance cases. Then, the vehicle insurance images classified based on an algorithm may be stored in a set vehicle insurance claim image database 130, so that they can be read and used in subsequent vehicle loss assessment and verification operations.

In embodiments of the present specification, the term "image" may be a general term of various graphics and pictures. The term "image" usually refers to a picture having a visual effect, generally including a picture on a paper media, photographic film, or photo, or on a screen of a TV, projector, or computer. The vehicle insurance images may include computer image data stored in a readable storage medium after photographing by a camera or an image shooting device, which may include vector graphics, bitmaps, static images, dynamic images, and many other types of computer images.

An embodiment is described below by using an accident case in a vehicle insurance service as an application scenario. In this embodiment, vehicle insurance images collected by an operator of a vehicle service provider at the site of the accident may all be stored in the vehicle insurance claim picture system 110 shown in FIG. 1. The algorithm server 120 may acquire some or all of the vehicle insurance images of the accident case from the vehicle insurance claim picture system 110. Afterwards, computation is performed on these vehicle insurance images by using a preset image classification algorithm, to output multi-dimensional property information related to the vehicle insurance images. For example, the property information may include classification of actual usage scenarios of the vehicle insurance images, such as vehicle damage images, object damage images, certificates, and the like. The property information may also include other key property information of the images, such as a vehicle model, color, photographing light conditions, and the like.

Figure 2:
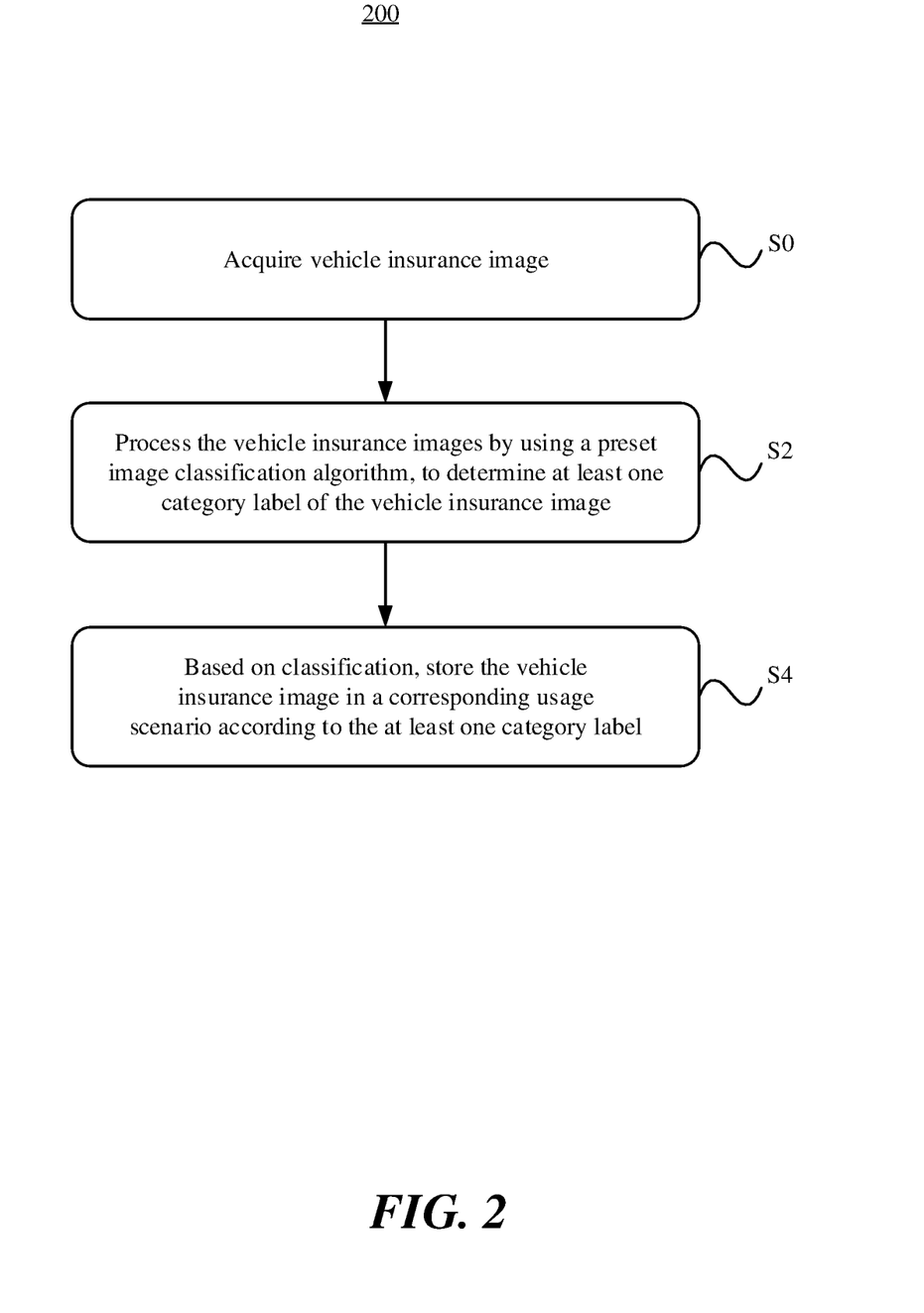
FIG. 2 is a flowchart of a vehicle insurance image processing method according to an embodiment.

FIG. 2 shows a flowchart of a vehicle insurance image processing method 200 according to an embodiment. The vehicle insurance image processing method 200 may include the following steps.

In step S0, a vehicle insurance image is acquired.

In step S2, the vehicle insurance image is processed by using a preset image classification algorithm, to determine at least one category label of the vehicle insurance image.

In step S4, based on classification, the vehicle insurance image is stored in a corresponding usage scenario according to the at least one category label.

In this embodiment, an algorithm server, such as the algorithm server 120 (FIG. 1), for performing recognition and scenario classification on the vehicle insurance image may acquire the original vehicle insurance image collected at the site. Referring to FIGS. 1 and 2, the image acquisition manner may include: acquiring from a common database such as the vehicle insurance claim picture system 110, acquiring from images uploaded in real time by the operator, or acquiring from another server or a third-party service provider.

The acquired vehicle insurance images may include image information of multiple image formats, photographing angles, and image contents. A single vehicle insurance service may include dozens of, or even hundreds of, vehicle insurance images, for example, multiple panoramic photos of a vehicle involved in an accident, photos of damaged parts, detail photos, photos of road and traffic conditions around the vehicle, light condition photos, certificate photos of a person involved in the accident, and the like. In this embodiment, these vehicle insurance images may be grouped into different usage scenarios according to handling needs of the vehicle insurance service, such as a loss assessment scenario, a vehicle model scenario, a color scenario, and the like. In each usage scenario, the images may be further classified into different categories, and each category may have a corresponding category label. One usage scenario may correspond to multiple category labels. For instance, in the loss assessment scenario, the following categories may be defined for loss assessment/verification: panoramic photo, part photo, detail photo, vehicle identification number, ID card, driver's license, driving license, and accident site photo. In a vehicle model scenario, different vehicle models may be defined: SUV, sedan, bus, truck, and the like. In the color scenario, different vehicle colors may be defined: black, red, white, and other colors. In an implementation scenario, one image may simultaneously have three category labels, i.e., a panoramic photo, SUV, and black. The specific types and number of the usage scenarios, and different image categories in each usage scenario, may be determined according to actual image handling needs and application scenarios.

The algorithm server 120 may process the acquired vehicle insurance image. For example, the algorithm server 120 may recognize and classify the vehicle insurance image by using the preset image classification algorithm, to output one or more category labels of each image. The image classification algorithm may be implemented by various means, for example, by using a Deep Neural Network (DNN) or a method based on conventional image characteristics. In an embodiment, a deep convolutional neural network (CNN) model may be used to implement classification of the vehicle insurance images. The deep convolutional neural network model may include a convolution layer, a pooling layer, an activation function, and a fully connected layer. Other implementation manners may use a mature CNN model, such as Inception-ResNet, or a customized CNN model.

In other embodiments, the algorithm server 120 may also first pre-process each picture in the current case, for example, may de-mean, normalize, or crop the picture, to remove some vehicle insurance images obviously not meeting the requirements.

In an implementation manner using a DNN, a structure of each layer, the size of a convolution kernel, and return parameters of the DNN may be pre-established. The selected neutral network parameters may be obtained by means of mini-batch gradient descent training with label data. For example, when mini-batch=32, 32 training pictures are input for training. The label data regarding a vehicle image may indicate a usage scenario of the image, a specific category of the image in the usage scenario, vehicle property information, photographing conditions/environment, and the like. The training pictures used for training by the DNN may be obtained by manually labeling the real vehicle insurance images.

Figure 3:
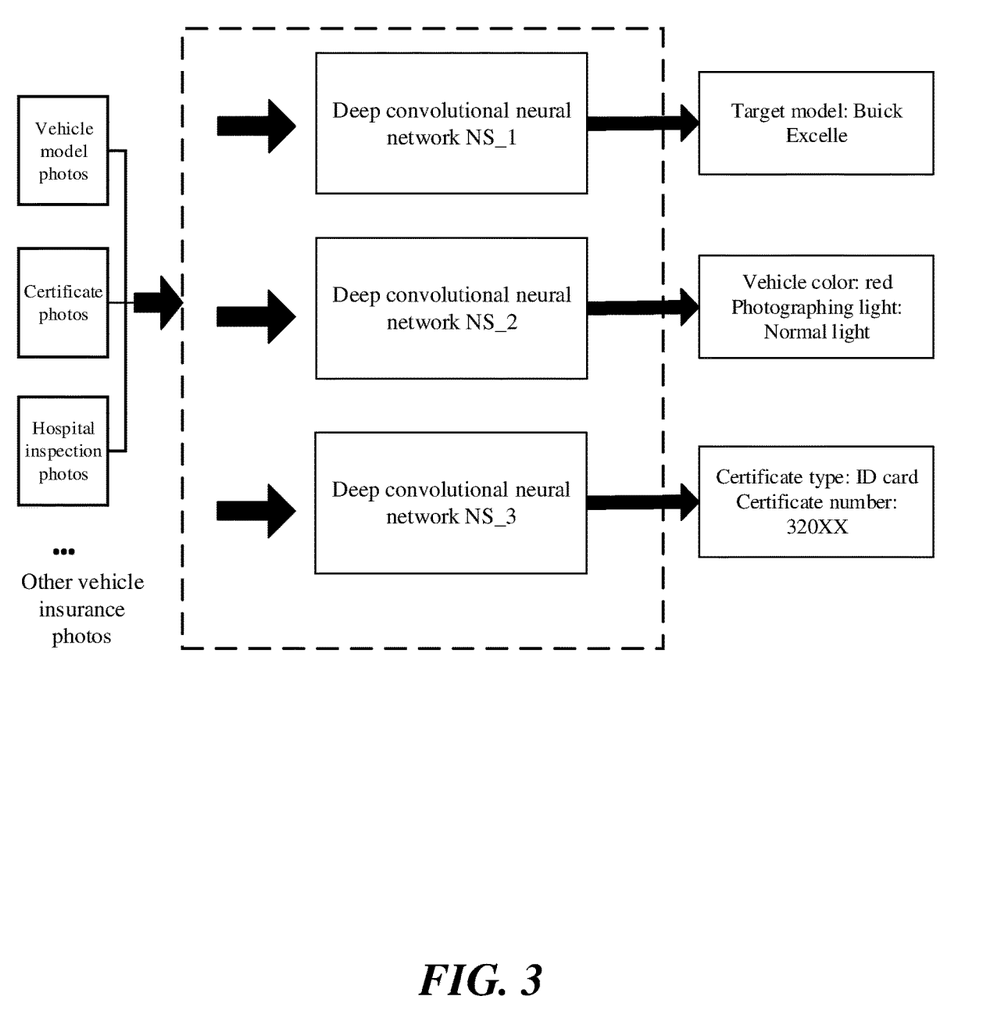
FIG. 3 is a schematic diagram of image processing using a single-task deep convolutional neural network classification model according to an embodiment.

In an embodiment, the preset image classification algorithm may be a single-task deep convolutional neural network classification model. For example, one deep convolutional neural network is used to output a classification result of one category, such as the vehicle color. FIG. 3 is a schematic diagram of image processing using a single-task deep convolutional neural network classification model according to an embodiment. In the embodiment shown in FIG. 3, a deep convolutional neural network NS_1 for recognizing the vehicle model, a deep convolutional neural network NS_2 for recognizing the vehicle color and light conditions, a deep convolutional neural network NS_3 for recognizing the certificate type, and other kinds of networks may be separately set. In this implementation manner, each deep convolutional neural network may be regarded as a single-task network model.

In another embodiment, the preset image classification algorithm may include using a multi-task deep convolutional neural network classification model which has a shared convolution layer.

Figure 4:
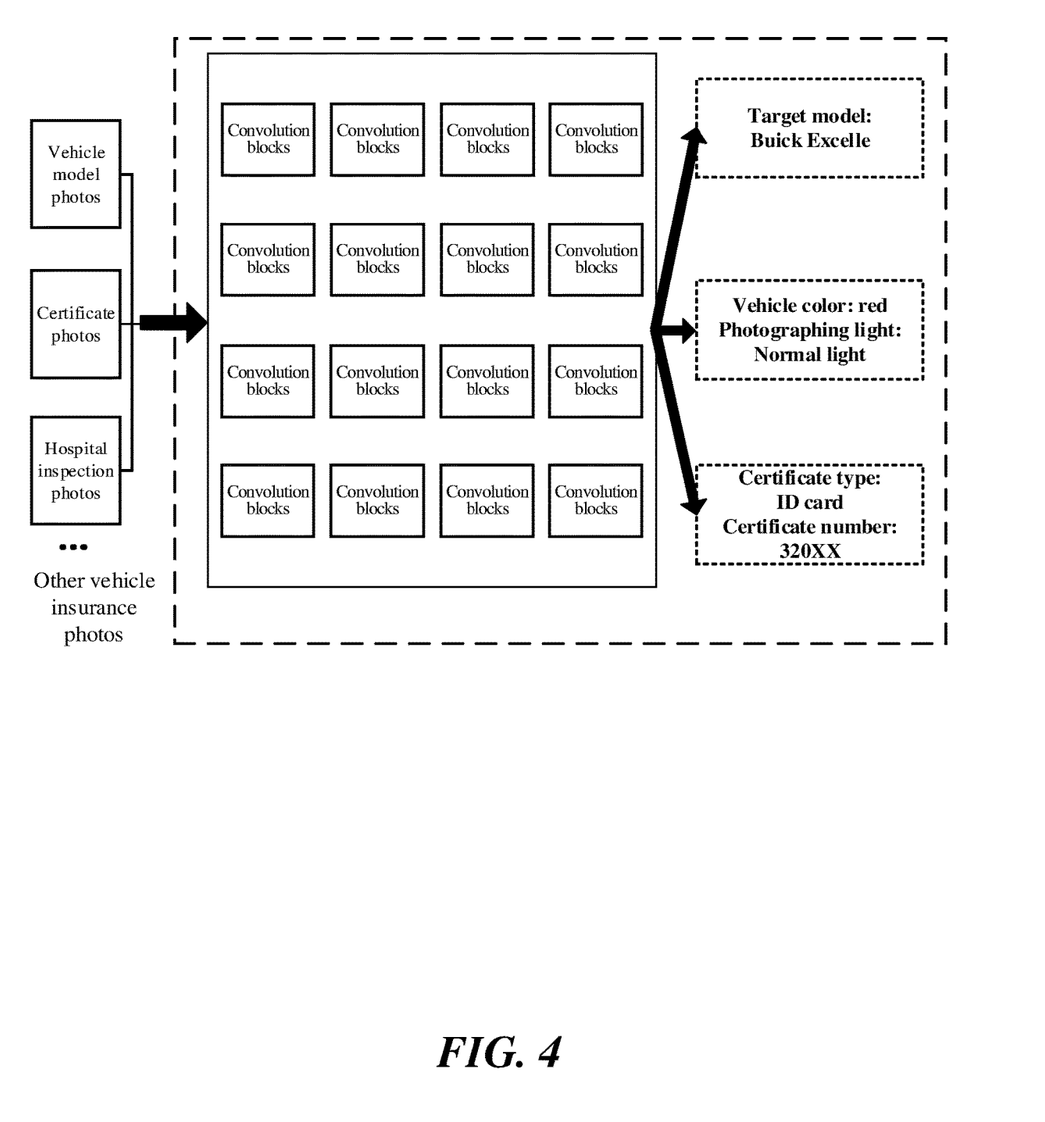
FIG. 4 is a schematic diagram of image processing using a multi-task deep convolutional neural network classification model which has a shared convolution layer according to an embodiment.

FIG. 4 is a schematic diagram of a multi-task deep convolutional neural network classification model which has a shared convolution layer according to an embodiment. In this embodiment, multiple deep convolutional neural network classification models can share parameters of a convolution layer and most parameters of a functional layer. The shared parameters are set according to requirements. In some embodiments, for the last several layers of the classification model with different tasks, including classification in different property dimensions, for example, classification based on vehicle model and classification based on color, parameters may not be shared. In this way, the multi-task deep convolutional neural network classification model which has the shared convolution layer can automatically classify numerous images in a vehicle insurance claim service and automatically acquire multi-dimensional image properties. Thus, compared with separately training each single-task model, the multi-task deep convolutional neural network classification model greatly shortens a predicated computation time, and enhances efficiency of processing the vehicle insurance images.

Classification results output by the algorithm server 120 may be written into a corresponding database, to implement classification-based storage in different usage scenarios. For example, a picture P1 in the foregoing instance has three category labels: a panoramic photo, SUV, and black. Therefore, the picture P1 can be stored in three usage scenarios, i.e., a loss assessment scenario, a vehicle model scenario, and a color scenario. Specifically, the picture P1 can be simultaneously stored as a panoramic photo in the loss assessment scenario, as an SUV photo in the vehicle model scenario, and as a black vehicle photo in the color scenario.

In another embodiment, a relational database having basic functions of a conventional relational database may be used to store the classification results of the vehicle insurance images. The basic functions of the relational database may include, e.g., joint data screening and operations, such as SELECT, INSERT, ALTER, and other related processing. In such a storage manner, an operator can flexibly, rapidly, and conveniently select images of a required category according to the requirements. Accordingly, the classification-based storage may include storing the classification results of the vehicle insurance images by using a relational database.

The images may be screened according to an actual service scenario. For example, when it is required to deal with the loss assessment service, images with three category labels, e.g., panoramic, part, and detail, may be extracted from the relational database by setting. In this way, images classified as panoramic, part, and detail photos based on a classification model in each case can all be rapidly selected, and the current service may rapidly enter a loss assessment or an assessment verification phase. Thus, a large number of interference pictures are automatically screened out, and photos in a loss assessment photo collection all belong to the same category, enhancing the processing efficiency. Functions such as manually adding a vehicle insurance image and its label, manually altering the category label of a photo, and searching according to the requirements may also be set for the relational database.

Figure 5:
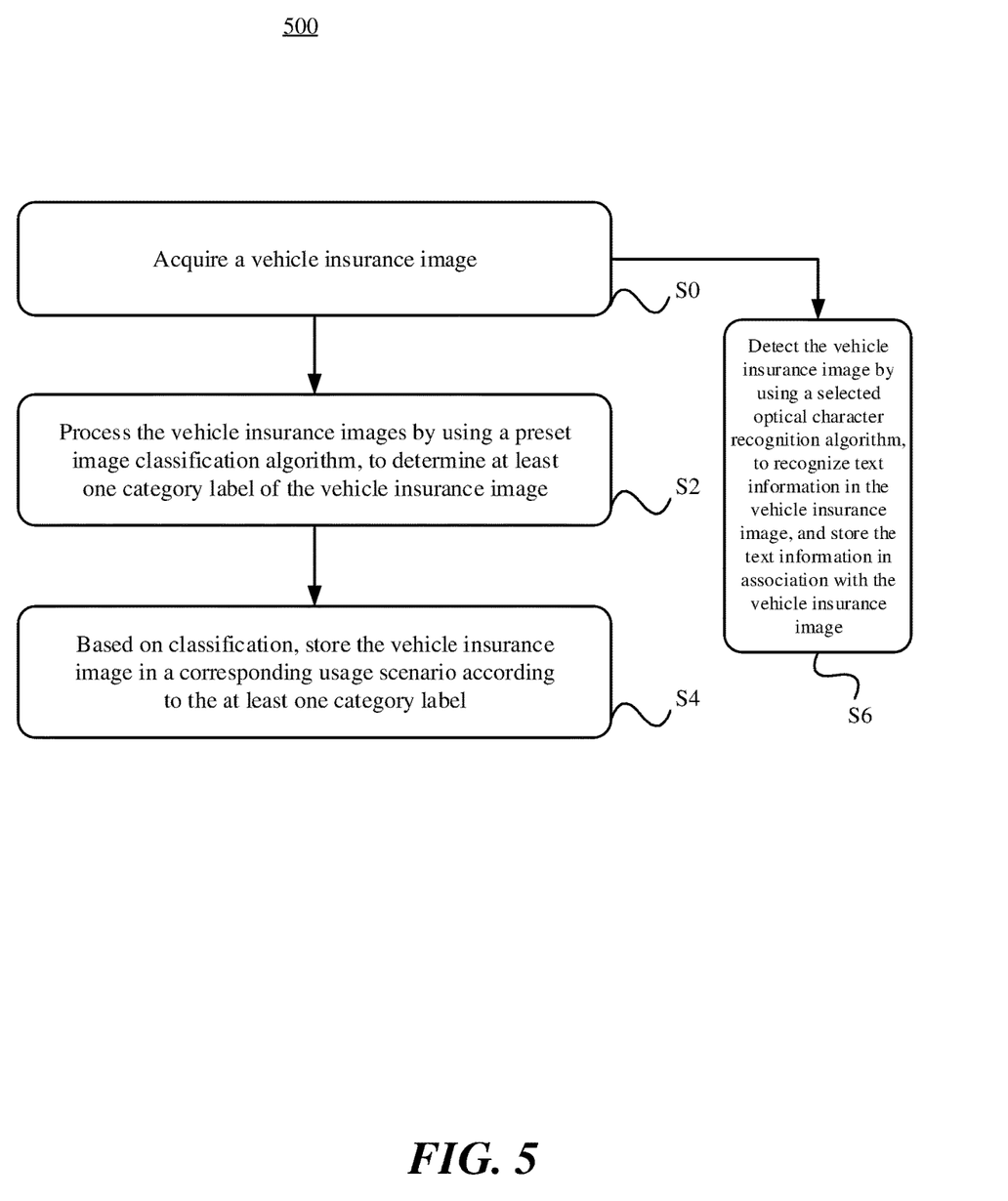
FIG. 5 is a flowchart of a vehicle insurance image processing method according to an embodiment.

In another embodiment, the method may further include detecting the vehicle insurance image by using a selected optical character recognition algorithm, to recognize text information in the vehicle insurance image; and storing the text information in association with the vehicle insurance image, which is shown as step S6 in FIG. 5.

FIG. 5 is a flowchart of a vehicle insurance image processing method 500 according to an embodiment. As shown in FIG. 5, an Optical Character Recognition (OCR) model (also referred to as a character recognition model) is introduced in the implementation of this embodiment, to detect, locate, and recognize key text information (for example, the name, certificate numbers, address, and the like) in the vehicle insurance image. For example, for certificate photos labeled with a vehicle identification number, ID card, driver's license, driving license, and bank card, a corresponding OCR character recognition model may be imported to detect, locate, and recognize the characters therein, and the results obtained by the OCR character recognition model may be written into a database, to be associated with the vehicle insurance image. By implementing the associated storage, corresponding vehicle insurance images or other associated information can be found by searching the database using the text information. For example, vehicle insurance images in all cases related to a person involved in the current accident can be found by searching using his/her ID card numbers.

In another embodiment, the method may further include detecting whether key information of a preset type in the text information is complete, and detection results of the key information are recorded.

This embodiment may further automatically verify whether key information in the vehicle insurance case is complete. For example, ID card information, information about the driver's license and driving license, bank card information, and the like can be acquired from the vehicle insurance images. The ID card information can be used for supervision of anti-money laundering; the information about the driver's license and driving license can be used to determine whether the involved person is insured to get compensation; and the bank card information can be used to ensure that the money is correctly transferred to the corresponding account. A case which gathers complete information may automatically enter a subsequent process. Thus, the solution of this embodiment can automatically detect images in different usage scenarios, to recognize character information in, for example, the certificate photos, and further to detect whether key information of a preset type in the text information is complete, and to record detection results of the key information. The detection results may be fed back to the insurance service operator. For example, when key information about the ID card is not found after detection or the number of digits is incomplete, this result is indicated to the operator, so that the operator can rapidly locate the missing key information, thereby greatly enhancing the efficiency of processing the vehicle insurance service by the operator and improving user experience.

Figure 6:
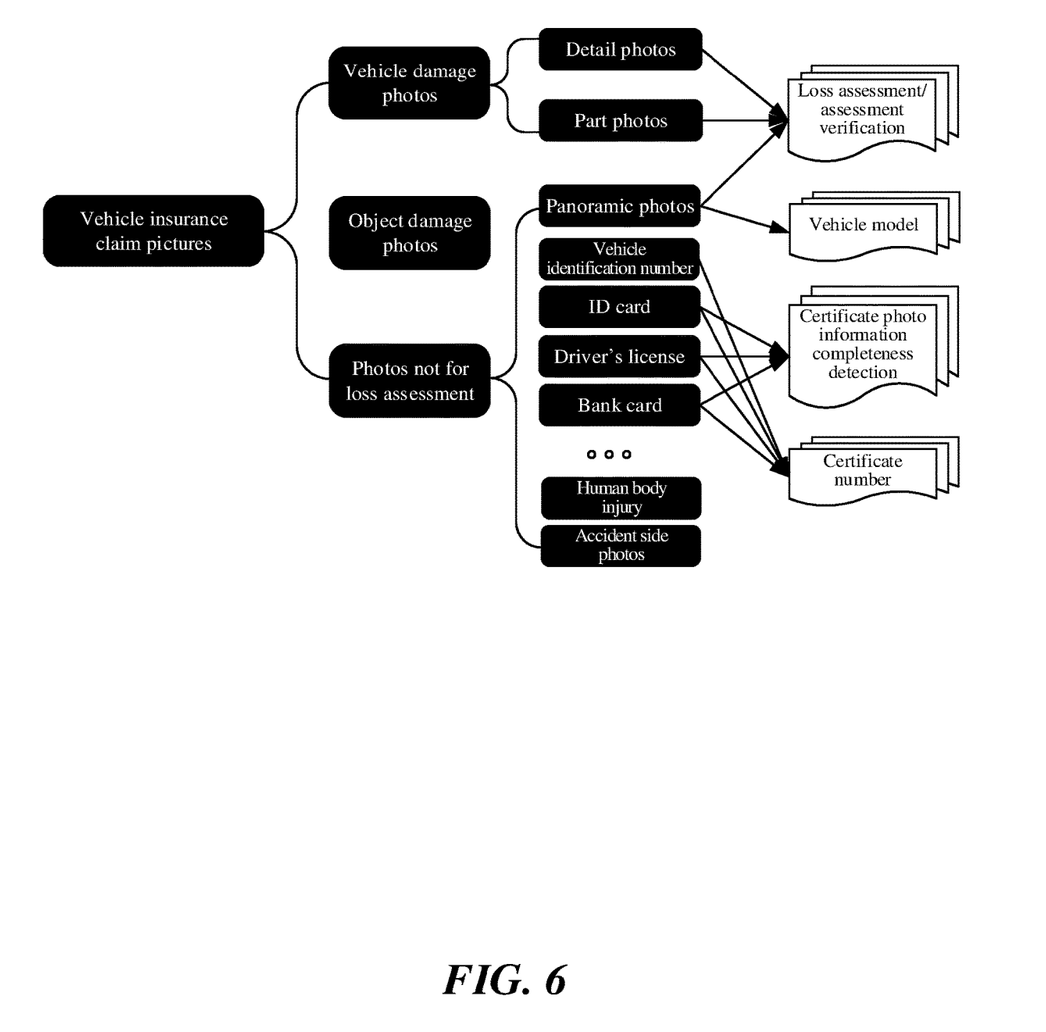
FIG. 6 is a schematic diagram of an implementation scenario of a vehicle insurance image processing method according to an embodiment.

FIG. 6 is a schematic diagram of an implementation scenario of the vehicle insurance image processing method according to an embodiment. In FIG. 6, vehicle insurance claim pictures collected and acquired at the site of an accident may be classified into three types: loss assessment photos, object damage photos, and photos not for loss assessment. The photos of each type may be further classified into multiple categories. According to different usage scenarios, such as loss assessment/assessment verification, vehicle insurance detection, certificate photo information completeness detection, certificate number recognition, and the like, the vehicle insurance images with corresponding category labels can be stored in corresponding usage scenarios. As described above, one vehicle insurance image can have several category labels and can be simultaneously stored in different usage scenarios.

In the vehicle insurance image processing method described above, the vehicle insurance images can be automatically processed by using a selected image classification algorithm, to recognize the category of each vehicle insurance image. By the solutions of the embodiments of the present specification, accuracy in classification of vehicle insurance images and efficiency of labeling vehicle insurance images can be greatly enhanced, the time spent in manual recognition and processing can be shortened, and the processing accuracy and reliability of vehicle insurance images can be improved.

Based on the foregoing vehicle insurance image processing method, embodiments of the present specification also provide a vehicle insurance image processing apparatus. The apparatus may be implemented with a system (including a distributed system), software (application), module, assembly, server, and client terminal. Since the implementation of the apparatus corresponds to the method, reference may be made to the implementation of the foregoing method for the specific implementation of the apparatus. As used hereinafter, the term "unit" or "module" may implement software, or hardware, or a combination of software and hardware with preset functions.

Figure 7:
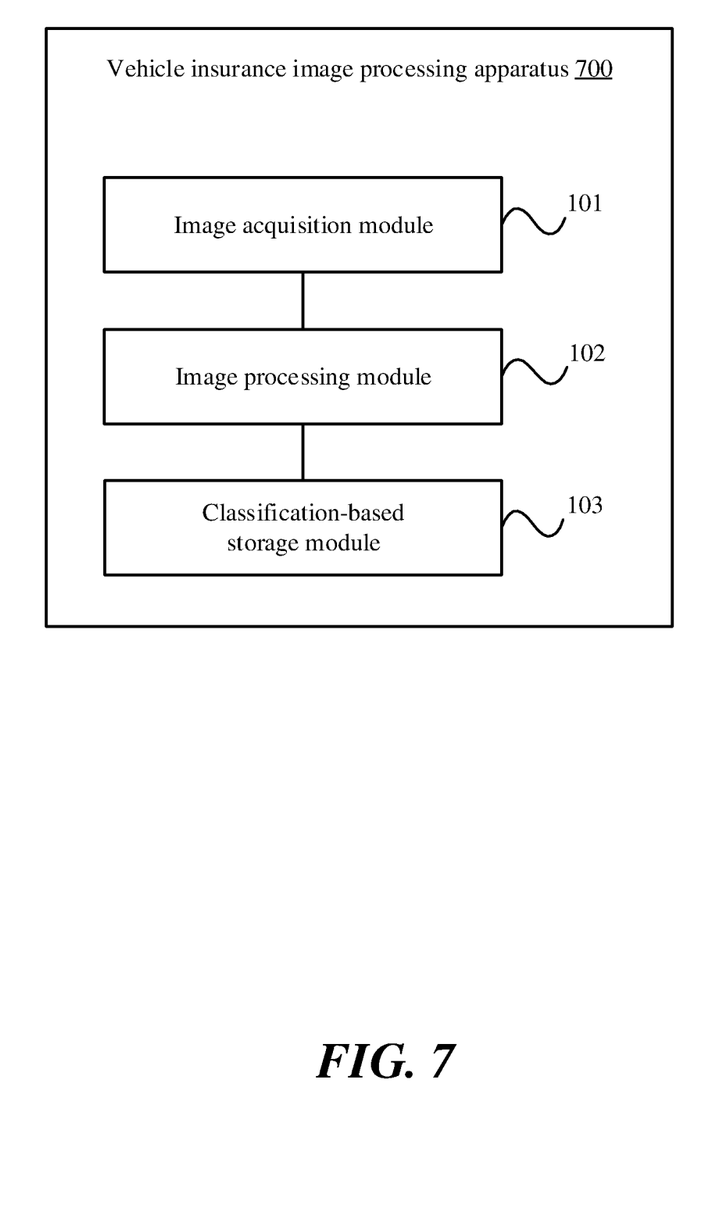
FIG. 7 is a schematic diagram of a vehicle insurance image processing apparatus according to an embodiment.

FIG. 7 is a schematic diagram of a vehicle insurance image processing apparatus 700 according to an embodiment. As shown in FIG. 7, the apparatus 700 may include: an image acquisition module 101 configured to acquire a vehicle insurance image; an image processing module 102 configured to process the vehicle insurance image by using a preset image classification algorithm, to determine at least one category label of the vehicle insurance image; and a classification-based storage module 103 configured to store, based on classification, the vehicle insurance image in a corresponding usage scenario according to the at least one category label.

The preset image classification algorithm may be implemented in multiple manners, for example, by using a classification algorithm based on image characteristics. In an apparatus according to another embodiment, the image processing module 102 may include a multi-task classification model module configured to use a multi-task deep convolutional neural network classification model which has a shared convolution layer as the image classification algorithm.

In an embodiment, the classification-based storage module 103 uses a relational database to store classification results of the vehicle insurance image.

Figure 8:
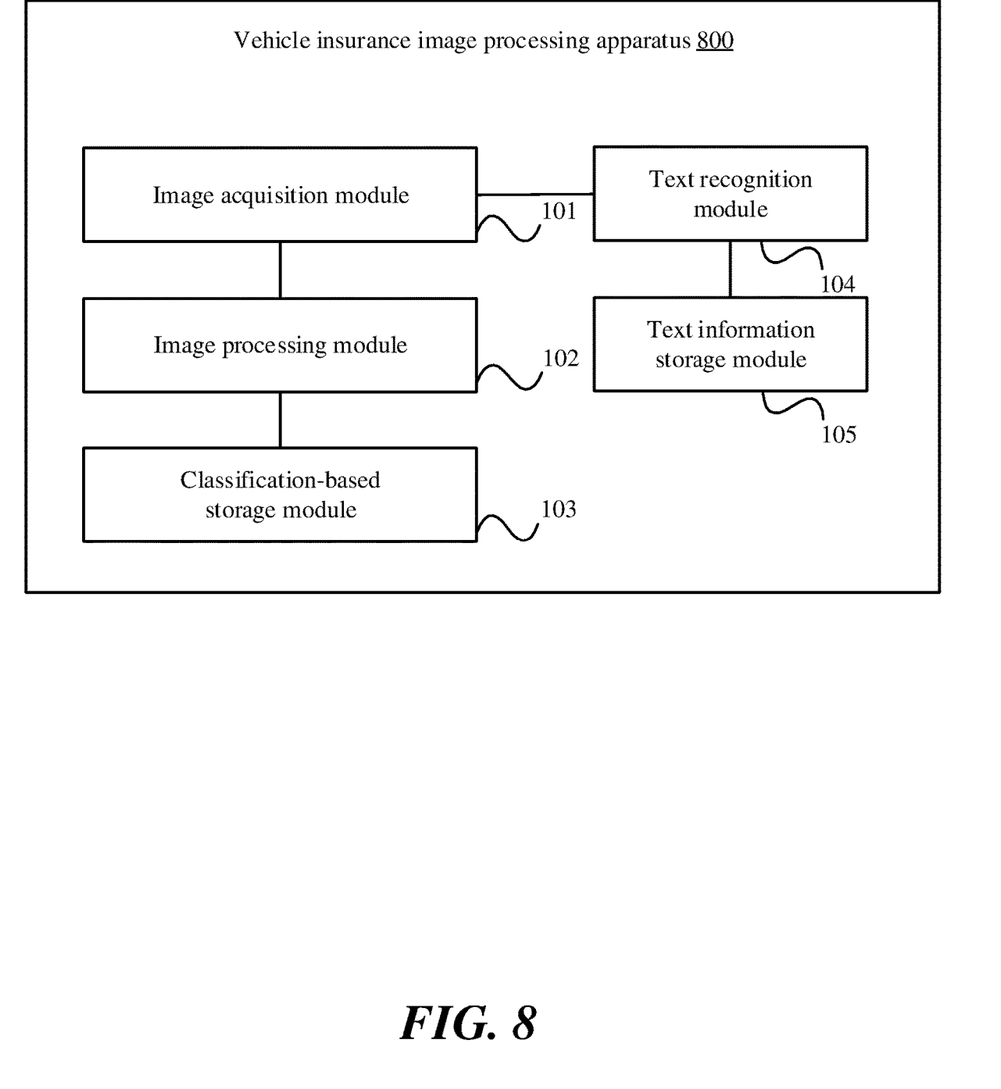
FIG. 8 is a schematic diagram of a vehicle insurance image processing apparatus according to another embodiment.

FIG. 8 is a schematic diagram of a vehicle insurance image processing apparatus 800 according to another embodiment. In this embodiment, the apparatus 800 may further include a text recognition module 104 configured to detect the vehicle insurance image by using a selected optical character recognition algorithm, to recognize text information in the vehicle insurance image; and a text information storage module 105 configured to store the text information in association with the vehicle insurance images.

Figure 9:
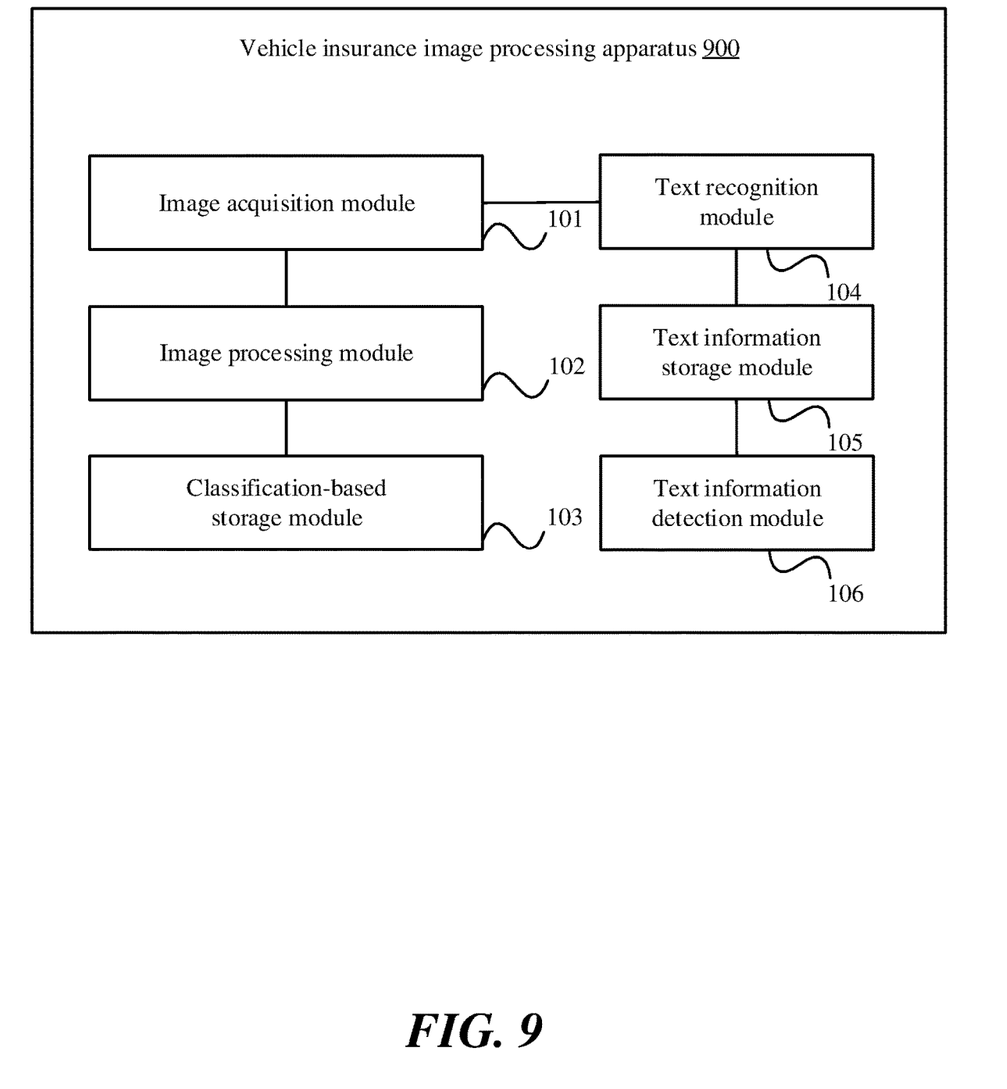
FIG. 9 is a schematic diagram of a vehicle insurance image processing apparatus according to still another embodiment.

FIG. 9 is a schematic diagram of a vehicle insurance image processing apparatus 900 according to another embodiment. As shown in FIG. 9, the apparatus 900 may further include a text information detection module 106 configured to detect whether key information of a preset type in the text information is complete, and record detection results of the key information.

It should be noted that, the apparatus described above may further include other implementation manners according to the description of the method embodiments. Reference may be made to the related description of the method embodiments for specific implementation manners, and the details are not described herein again.

The vehicle insurance image processing apparatus provided by embodiments of the present specification can automatically process vehicle insurance images by using a selected image classification algorithm, to recognize the category of each vehicle insurance image. By the solutions of the embodiments of the present specification, accuracy in classification of vehicle insurance images and efficiency of labeling vehicle insurance images can be greatly enhanced, the time spent in manual recognition and processing can be shortened, and the processing accuracy and reliability of vehicle insurance images can be improved.

The foregoing vehicle insurance image processing method or apparatus provided by the embodiments of the present specification may be implemented by a processor by executing corresponding program instructions in a computer. For example, the method or apparatus may be implemented on a server end using the c++ language of the Windows operating system, a server based on the Linux system, or a server system terminal using, for example, the Android or iOS system programming language; or may be implemented by processing logics based on a quantum computer. In a vehicle insurance image processing apparatus according to another embodiment, the apparatus may include a processor and a memory for storing instructions executable by the processor. The processor implements the following operations when executing the instructions: acquiring a vehicle insurance image; processing the vehicle insurance image by using a preset image classification algorithm, to determine at least one category label of the vehicle insurance image; and based on classification, storing the vehicle insurance image in a corresponding usage scenario according to the at least one category label.

In an embodiment, when the processor executes the instructions, the using the image classification algorithm includes: using a multi-task deep convolutional neural network classification model which has a shared convolution layer.

It should be noted that, the apparatus described above may further include other implementation manners according to the description of the method embodiments. Reference may be made to the related description of the method embodiments for specific implementation manners, and the details are not described herein again.

The vehicle insurance image processing apparatus described in the foregoing embodiment can automatically process vehicle insurance images by using a selected image classification algorithm, to recognize the category of each vehicle insurance image. By the solution of the embodiment of the present specification, accuracy in classification of vehicle insurance images and efficiency of labeling vehicle insurance images can be greatly enhanced, the time spent in manual recognition and processing can be shortened, and the processing accuracy and reliability of vehicle insurance images can be improved.

The above-described method can be applied in various vehicle insurance image data processing apparatuses, such as servers, thus greatly enhancing accuracy in classification of vehicle insurance images and efficiency of labeling images, and expanding property dimensions of image classification.

Figure 10:
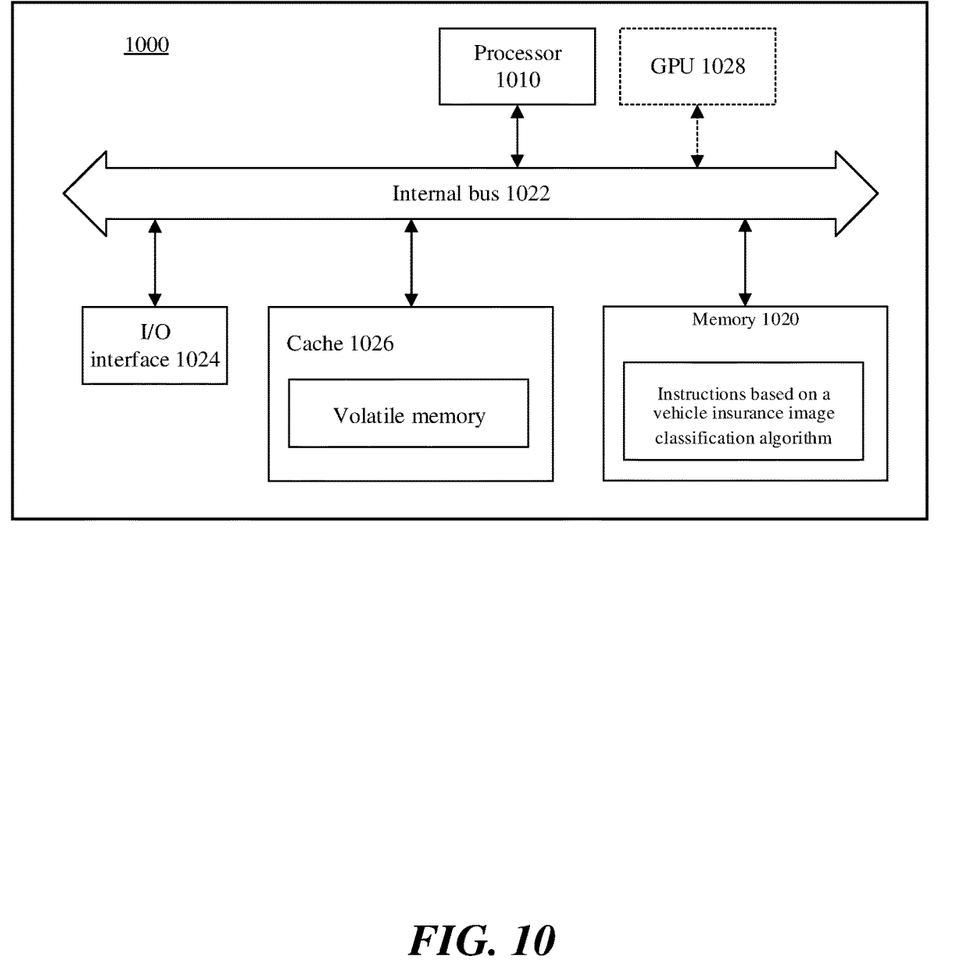
FIG. 10 is a schematic diagram of a vehicle insurance image apparatus according to an embodiment.

FIG. 10 is a schematic diagram of a vehicle insurance image data processing apparatus 1000 according to an embodiment. For example, the apparatus 1000 may be implemented as a server. As shown in FIG. 10, the apparatus 1000 may include at least one processor 1010 and a memory 1020 for storing instructions executable by the processor 1010. The apparatus 1000 may also include an internal bus 1022, an I/O interface 1024, a cache 1026, a GPU 1028, etc.

The processor 1010 may include one or more dedicated processing units, application-specific integrated circuits (ASICs), field-programmable gate arrays (FPGAs), or various other types of processors or processing units. The processor 1010 is coupled with the memory 1020 and is configured to execute instructions stored in the memory 1020 to perform the above described methods.

The processor 1010 may implement the following operations when executing the instructions: acquiring a vehicle insurance image; processing the vehicle insurance image by using a preset image classification algorithm, to determine at least one category label of the vehicle insurance image; and based on classification, storing the vehicle insurance image in a corresponding usage scenario according to the at least one category label.

An embodiment of the present specification further provides a vehicle insurance image system. The system may include a collected-image storage unit, which may be a memory device; an algorithm server; and a vehicle insurance image database. Similar to the apparatus 1000, the algorithm server includes at least one processor and a memory for storing instructions executable by the processor. The processor implements the following operations when executing the instructions: acquiring a vehicle insurance image from the collected image storage unit; processing the vehicle insurance image by using a preset image classification algorithm, to determine at least one category label of the vehicle insurance image; and storing the vehicle insurance image, according to the at least one category label, in a storage zone of a corresponding usage scenario in the vehicle insurance image database.

The apparatus or server or system described above may further include other implementation manners according to the description of the method embodiments. Reference may be made to the related description of the method embodiments for specific implementation manners, and the details are not described herein again. The embodiments in the specification are described progressively. Identical or similar parts of the embodiments may be referenced to each other. In each embodiment, the part that is different from other embodiments is mainly described. Embodiments based on hardware and program are similar to the method embodiments, and therefore are described in a relatively simple manner. Reference may be made to the descriptions in the method embodiments for related parts.

Specific embodiments of the specification have been described above. Other embodiments are within the scope of the appended claims. In some cases, the actions or steps recorded in the claims can be performed in a different order than that in the embodiments and can still achieve a desired result. In addition, the process described in the accompanying drawings does not necessarily require that the method be performed in the shown specific sequence or consecutive sequence to achieve the desired result. In some implementation manners, multitasking and parallel processing are also feasible or probably advantageous. The dashed lines in the accompanying drawings of the present specification may represent additional processing steps or modular units in other method or apparatus embodiments.

The vehicle insurance image processing method, apparatus, server, and system provided by embodiments of the present specification can automatically process vehicle insurance images by using a selected image classification algorithm, to recognize the category of each vehicle insurance image. By the solutions of the embodiments of the present specification, accuracy in classification of vehicle insurance images and efficiency of labeling vehicle insurance images can be greatly enhanced, the time spent in manual recognition and processing can be shortened, and the processing accuracy and reliability of vehicle insurance images can be improved.

The contents of the embodiments of the present specification have described the vehicle insurance image acquisition manner, the classification of usage scenarios and setting of the category labels thereof, the image classification algorithm based on a deep convolutional network, the classification manner based on conventional image characteristics, establishment of a data model such as a convolutional neural network model which has a shared convolution layer, and data definition, acquisition, interaction, computation, and judgment. However, the embodiments of the present specification are not limited to those that must comply with industry communication standards, and standard computer data processing and storage rules; and are not limited to the situations described in embodiments of the present specification. Some industry standards or implementations that use a customized manner or are slightly modified based on the described embodiments can also achieve an identical, equivalent, or similar implementation effect, or an effect predictable after transformation of the above-described embodiments. Embodiments obtained by applying these modified or transformed data acquisition, storage, judgment, and processing manners still fall within the scope of alternative implementations of the embodiments of the present specification.

Each of the above described methods, modules, and units may be implemented as software, or hardware, or a combination of software and hardware. For example, a Programmable Logic Device (PLD) (for example, a Field Programmable Gate Array (FPGA)) is such an integrated circuit whose logic functions are determined by devices programmed by a user. Designers program by themselves to integrate a digital system into a piece of PLD, without the need to ask a chip manufacturer to design and manufacture a dedicated integrated circuit chip. Moreover, at present, the programming is mostly implemented by using logic compiler software, instead of manually manufacturing an integrated circuit chip. The logic compiler software is similar to a software complier used for developing and writing a program, and original codes before compiling also need to be written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art also should know that a hardware circuit for implementing the logic method procedure may be easily obtained by slightly logically programming the method procedure using the above several hardware description languages and programming it into an integrated circuit.

A controller may be implemented in any suitable manner in the above described embodiments. For example, the controller may be in the form of, for example, a microprocessor or a processor and a computer-readable storage medium storing a computer-readable program code (for example, software or firmware) executable by the (micro) processor, a logic gate, a switch, an Application Specific Integrated Circuit (ASIC), a programmable logic controller, and an embedded micro-controller. Examples of the controller include, but are not limited to, the following microcontrollers: ARC 625D, Atmel AT91SAM, Microchip PIC18F26K20, and Silicone Labs C8051F320. A memory controller may also be implemented as a part of control logic of a memory. Those skilled in the art also know that the controller may be implemented by using pure computer-readable program codes, and in addition, the method steps may be logically programmed to enable the controller to implement the same function in a form of a logic gate, a switch, an application specific integrated circuit, a programmable logic controller and an embedded microcontroller. Therefore, this type of controller may be considered as a hardware component, and apparatuses included therein for implementing various functions may also be considered as structures inside the hardware component. Or, the apparatuses used for implementing various functions may be considered as both software modules for implementing the method and structures inside the hardware component.

The system, apparatus, module or unit illustrated in the above embodiments may be specifically implemented by using a computer chip or an entity, or a product having a certain function. A typical implementation apparatus is a computer. The computer may be, for example, a personal computer, a laptop computer, a vehicle-mounted human-machine interaction apparatus, a cellular phone, a camera phone, a smart phone, a personal digital assistant, a media player, a navigation apparatus, an email apparatus, a game console, a tablet computer, a wearable apparatus, or a combination of any of these apparatuses.

Although operating steps of the method are described with flowcharts, the method may include more or fewer steps by conventional or non-creative means. The sequence of steps listed in the embodiments is merely an example, and does not represent a unique execution sequence. When an actual apparatus or terminal product executes the steps, the steps may be executed sequentially or in parallel (for example, by a parallel processor, or in a multithreaded environment or even a distributed data processing environment) according to the method sequence shown in the embodiments or the accompanying drawings. The term "include," "comprise" or other variations thereof are intended to cover non-exclusive inclusion, so that a process, method, article or apparatus including a series of elements not only includes the elements, but also includes other elements not expressly listed, or further includes inherent elements of the process, method, article or apparatus. In a case without any more limitations, the elements do not exclude that the process, method, article or apparatus including the elements further has other identical or equivalent elements.

For ease of description, when the apparatus is described above, it is divided into various modules in terms of functions for respective descriptions. When the embodiments are implemented, functions of the modules may be implemented in the same or multiple pieces of software and/or hardware, or modules for implementing the same function may be implemented by using a combination of multiple sub-modules or sub-units. The apparatus embodiments described above are merely illustrative. For example, the units are classified merely according to their logical functions, and may be classified in other manners during actual implementation. For example, multiple units or components may be combined or integrated into another system, or some features may be omitted or not implemented. In addition, the shown or discussed mutual coupling or direct coupling or communicative connection may be an indirect coupling or communicative connection through some interfaces, apparatuses or units in an electrical or mechanical form, or other forms.

In some embodiments, a computer program instruction may be used to implement each process and/or block in the flowcharts and/or block diagrams and combinations of processes and/or blocks in the flowcharts and/or block diagrams. These computer program instructions may be provided for a general-purpose computer, a special-purpose computer, an embedded processor, or a processor of any other programmable data processing apparatus to generate a machine, so that the instructions executed by a computer or a processor of any other programmable data processing apparatus generate an apparatus for implementing a specified function in one or more processes in the flowcharts and/or in one or more blocks in the block diagrams.

These computer program instructions may also be stored in a computer-readable memory that can instruct the computer or any other programmable data processing apparatus to work in a particular manner, such that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing apparatus, such that a series of operation steps are performed on the computer or another programmable apparatus, thereby generating computer-implemented processing. Therefore, the instructions executed on the computer or another programmable apparatus provide steps for implementing a specified function in one or more processes in the flowcharts and/or in one or more blocks in the block diagrams.

The computer-readable storage medium may include permanent and non-permanent media as well as movable and non-movable media, and may implement information storage by means of any method or technology. Information may be a computer-readable instruction, a data structure, and a module of a program or other data. Examples of the computer-readable storage medium include, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage apparatuses, or any other non-transmission medium, and can be used to store information accessible by the computing apparatus. The computer-readable storage medium does not include transitory media, such as a modulated data signal and a carrier.

Those skilled in the art will understand that one or more embodiments of the present application may be provided as a method, a system, or a computer program product. Therefore, the embodiment may be implemented as a complete hardware embodiment, a complete software embodiment, or an embodiment combining software and hardware. Moreover, one or more embodiments of the present application may be in the form of a computer program product implemented on one or more computer usable storage media (including, but not limited to, a magnetic disk memory, a CD-ROM, an optical memory and the like) including computer usable program code.

In some embodiments, the above described methods and apparatuses may be implemented with a computer executable instruction executed by a computer, for example, a program module. Generally, the program module includes a routine, a program, an object, an assembly, a data structure, and the like used for executing a specific task or implementing a specific abstract data type. The above described methods and apparatuses may also be implemented in distributed computing environments, and in the distributed computer environments, a task is executed by using remote processing apparatuses connected through a communications network. In the distributed computer environment, the program module may be located in local and remote computer storage media including a storage apparatus.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A vehicle insurance image processing method, comprising:
acquiring a vehicle insurance image;
processing the vehicle insurance image by using a preset image classification algorithm, to determine at least one category label of the vehicle insurance image; and
storing, based on classification, the vehicle insurance image in a corresponding usage scenario according to the at least one category label,
wherein the using the preset image classification algorithm comprises:
using a multi-task deep convolutional neural network classification model which has a shared convolution layer.

2. The vehicle insurance image processing method of claim 1, wherein the storing, based on classification, comprises:
storing classification results of the vehicle insurance image by using a relational database.

3. The vehicle insurance image processing method of claim 2, further comprising:
detecting the vehicle insurance image by using a selected optical character recognition algorithm, to recognize text information in the vehicle insurance image; and
storing the text information and the vehicle insurance image in an associated manner.

4. The vehicle insurance image processing method of claim 3, wherein after the text information in the vehicle insurance image is recognized, the method further comprises:
detecting whether key information of a preset type in the text information is complete, and recording detection results of the key information.

5. A vehicle insurance image processing apparatus, comprising:
a processor; and
a memory storing instructions executable by the processor,
wherein, when executing the instructions, the processor performs:
acquiring a vehicle insurance image;

processing the vehicle insurance image by using a preset image classification algorithm, to determine at least one category label of the vehicle insurance image; and storing, based on classification, the vehicle insurance image in a corresponding usage scenario according to the at least one category label, wherein the using the preset image classification algorithm comprises:

using a multi-task deep convolutional neural network classification model which has a shared convolution layer.

6. The vehicle insurance image processing apparatus of claim 5, wherein, when executing the instructions, the processor further performs:

using a relational database to store classification results of the vehicle insurance image.

7. The vehicle insurance image processing apparatus of claim 6, wherein, when executing the instructions, the processor further performs:

detecting the vehicle insurance image by using a selected optical character recognition algorithm, to recognize text information in the vehicle insurance image; and storing the text information and the vehicle insurance image in an associated manner.

8. The vehicle insurance image processing apparatus of claim 7, wherein, when executing the instructions, the processor further performs:

detecting whether key information of a preset type in the text information is complete, and recording detection results of the key information.

9. The vehicle insurance image processing apparatus of claim 5, being a server.

10. A vehicle insurance image system, comprising:

a collected-image storage unit;

an algorithm server; and a vehicle insurance image database, wherein the algorithm server comprises at least one processor and a memory for storing instructions executable by the processor, and when executing the instructions, the at least one processor performs:

acquiring a vehicle insurance image from the collected-image storage unit;

processing the vehicle insurance image by using a preset image classification algorithm, to determine at least one category label of the vehicle insurance image; and storing the vehicle insurance image, according to the at least one category label, in a storage zone of a corresponding usage scenario in the vehicle insurance image database, wherein the using the preset image classification algorithm comprises:

using a multi-task deep convolutional neural network classification model which has a shared convolution layer.

* * * * *